United States Patent [19]
Helterbrand

[11] Patent Number: 5,232,270
[45] Date of Patent: Aug. 3, 1993

[54] SPOKED WHEEL

[76] Inventor: David L. Helterbrand, 3508 University Dr., Garland, Tex. 75043

[21] Appl. No.: 847,628

[22] Filed: Mar. 6, 1992

[51] Int. Cl.⁵ ............................................. B60B 1/00
[52] U.S. Cl. ................................ 301/64.4; 301/64.1; 301/104
[58] Field of Search ............... 301/1, 105 R, 5.1, 64.1, 301/64.3, 64.5, 64.4, 64.2, 105.1, 104

[56] References Cited

U.S. PATENT DOCUMENTS

| | | |
|---|---|---|
| 665,467 | 1/1901 | Riblet . |
| 687,057 | 11/1901 | Parker . |
| 806,872 | 12/1905 | Clark . |
| 917,450 | 4/1909 | Brown et al. . |
| 1,115,919 | 11/1914 | Flatau . |
| 1,124,654 | 1/1915 | Pomeroy . |
| 1,256,086 | 2/1918 | Whidden . |
| 1,296,151 | 3/1919 | Acker .................... 301/63 DS X |
| 1,313,913 | 8/1919 | Rey . |
| 1,320,999 | 11/1919 | Baker ....................... 301/64 R X |
| 1,379,577 | 5/1921 | Killen ............................ 301/64 R |
| 1,414,594 | 5/1922 | Snow ............................. 301/63 DS |
| 1,654,035 | 12/1927 | Campos et al. .............. 301/63 DS |
| 1,664,531 | 4/1928 | Thompson ................ 301/63 DS X |
| 2,348,550 | 5/1944 | Kraft et al. ............... 301/63 DS X |
| 2,490,184 | 6/1948 | Wojtech, Jr. ..................... 267/41 |
| 2,592,164 | 4/1952 | Maxam ............................... 301/63 |
| 4,844,552 | 7/1989 | Tsygankov et al. ...... 301/63 DD X |

*Primary Examiner*—Russell D. Stormer
*Attorney, Agent, or Firm*—Baker & Botts

[57] ABSTRACT

There is provided a metallic wheel having multiple planes of wire-like spokes and a rim for mounting a tire, and a method for fabricating the spoked wheel members entirely from flat sheet metal. The wheel comprises a pair of inner wheel members, a pair of outer wheel members, an externally threaded shaft, and a spacer. The inner and outer wheel members each have a peripheral rim, a central hub, and a plurality of spokes extending generally inward from the peripheral rim to the central hub. The inner wheel members have a plurality of pins projecting from their peripheral rims which mate with correspondingly arranged holes in the peripheral rims of the outer wheel members. The externally threaded shaft threadably mates with internally threaded orifices in the hubs of the outer members. The spacer has an internally threaded hole extending therethrough for threadably mating with the externally threaded shaft between the hubs of the inner wheel members for maintaining a predetermined distance between the inner wheel members.

5 Claims, 3 Drawing Sheets

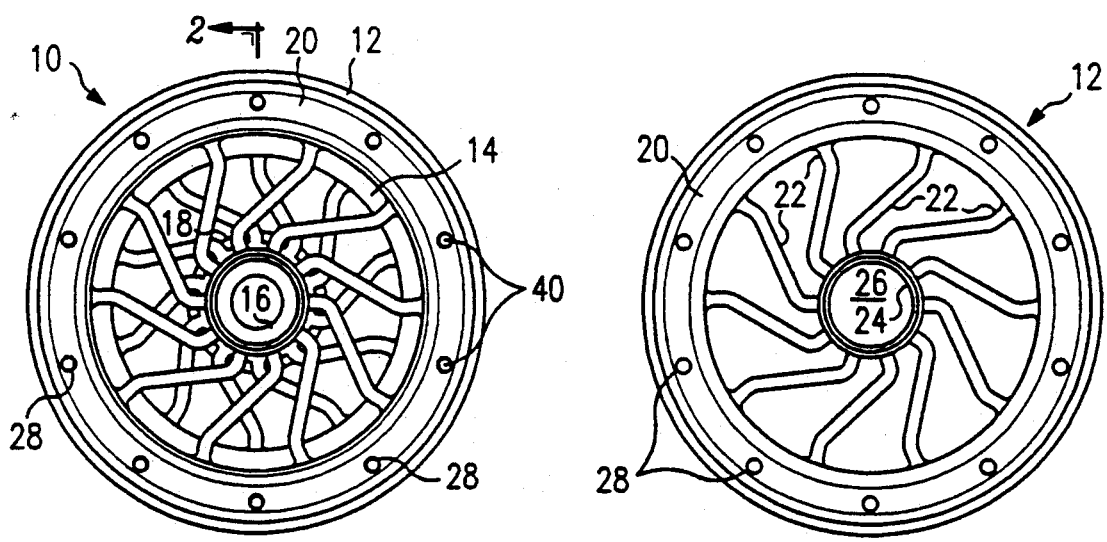
FIG. 1
FIG. 3
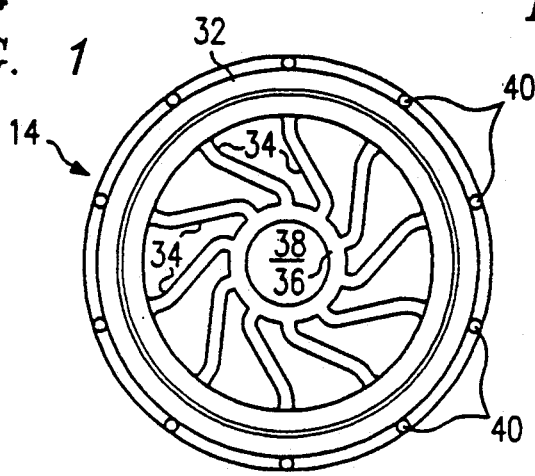
FIG. 4
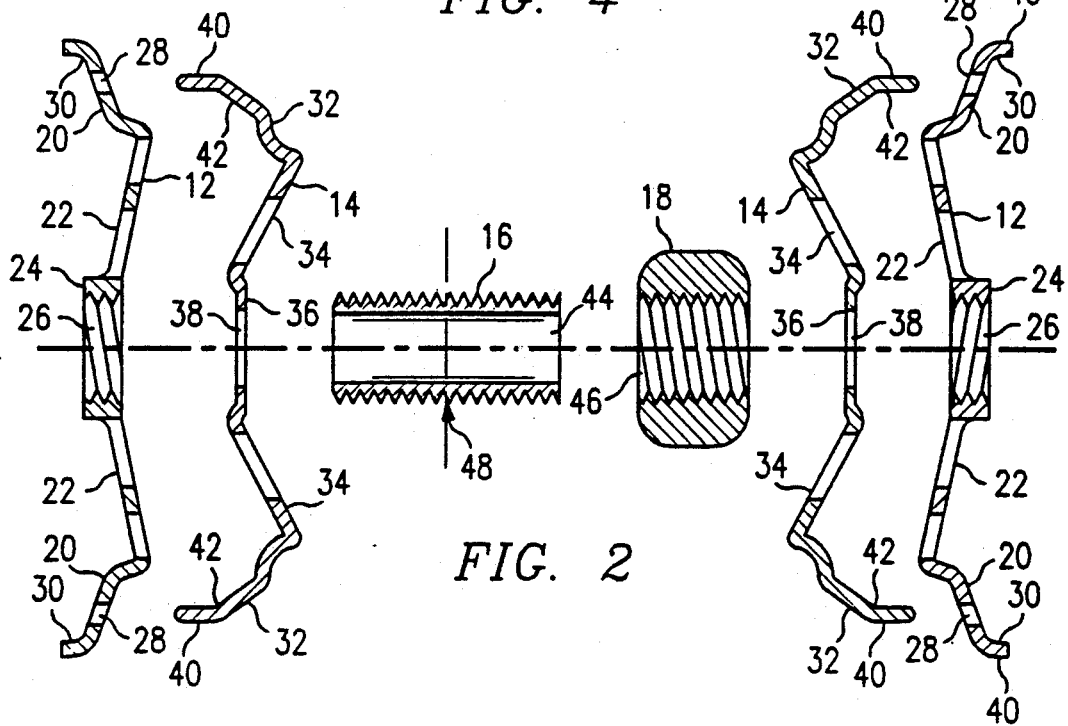
FIG. 2

SPOKED WHEEL

TECHNICAL FIELD OF THE INVENTION

This invention generally relates to wheels, and, more particularly, is concerned with a metallic wheel having multiple planes of wire-like spokes and a rim for mounting a tire, and to a method for fabricating the spoked members from flat sheet metal.

BACKGROUND OF THE INVENTION

The wheel was one of man's earliest and most important inventions. Since the first wheel was invented by the proverbial cave man centuries ago, many types and styles of wheels have been made.

The wheels presently known have various features of construction. For example, U.S. Pat. No. 1,313,913, issued to Rey, discloses a vehicle wheel having two spoke assemblies connected to a threaded hub. However, the spokes of the Rey wheel are not formed as an integral part of the wheel rim. Rather, the spokes are clamped to the rim by a plurality of bolts around the periphery of the wheel. The spoke hubs are held in place by locknuts or collars threaded onto the hub shaft. The Rey wheel also has a cap threaded over one end of the hub shaft. Therefore, the hub cannot receive a wheel axle through both ends.

U.S. Pat. No. 1,115,919, issued to Flateau, discloses a vehicle wheel having rim members on opposite sides of the wheel which are held together by many bolts around the wheel periphery. The Flateau wheel, like the Rey wheel, also does not have a hollow center shaft open on both ends.

U.S. Pat. No. 917,450, issued to Jones, discloses a sheave or trolley wheel having a hollow hub member and opposite sides held together with two thimbles or collars. The Jones wheel, however, has no spokes.

U.S. Pat. No. 665,467, issued to Riblet, discloses a sheave for wire-rope aerial tramways which has two sides held together by a plurality of bolts. The Riblet sheave has neither spokes nor a hollow hub at its center.

U.S. Pat. No. 1,124,654, issued to Pomeroy, discloses a toy wheel with a discontinuous rim held together by a band around the periphery of the wheel. The spokes are separate members from both the hub and the rim, and are inserted into radial sockets on the hub member, and into holes in the rim. Thus, assembly of the Pomeroy wheel is quite awkward and time consuming.

U.S. Pat. No. 806,872, issued to Clark, discloses a toy wheel having integral spoke, rim, and hub members, but which does not accommodate a tire. Also, the Clark wheel parts are assembled directly on the vehicle axle, and are held together by permanently deforming the outer end of the axle shaft. Thus, once installed on a vehicle axle, the Clark wheel cannot be removed or disassembled if the need to do so arises.

U.S. Pat. No. 687,057, issued to Parker, discloses another toy wheel which requires permanent attachment of the wheel to the vehicle axle by deforming the end of the axle shaft after assembly of the wheel.

U.S. Pat. No. 1,256,086, issued to Whidden, discloses a toy wheel having no spokes or tire rim.

Finally, U.S. Pat. No. 2,592,164, issued to Maxam, discloses a model airplane wheel which requires a sheet metal band around its periphery, and which has no spokes.

Thus, despite the proliferation of wheel designs since the first wheel was invented, a need still exists for a spoked, tire-receiving wheel that is quickly and easily assembled separately from the vehicle axle without nuts, bolts, screws, rivets, or peripheral bands. Such a wheel will preferably have a hollow hub open on both ends for receiving an axle and be removable from the axle once installed. For simplicity of construction and minimization of cost, the wheel spokes will preferably be formed integrally with the rim and hub members. Ideally, an integral rim-spokes-hub member will be three dimensional and decorative, but formed entirely from inexpensive sheet metal.

SUMMARY OF THE INVENTION

The present invention provides a metallic wheel having multiple planes of wire-like spokes and a rim for mounting a tire. The invention also provides a method for fabricating the spoked wheel members from flat sheet metal. The wheel comprises a pair of inner wheel members each having a peripheral rim, a central hub having an orifice extending therethrough, and a plurality of spokes extending generally inward from the peripheral rim to the central hub. The wheel also includes a pair of outer wheel members each having a peripheral rim, a central hub having an internally threaded orifice extending therethrough, and a plurality of spokes extending generally inward from the peripheral rim to the central hub. The wheel includes an externally threaded shaft for threadably connecting to the orifices in the hubs of the outer wheel members, and for holding the outer and inner wheel members together.

BRIEF DESCRIPTION OF THE DRAWINGS

For a more complete understanding of the present invention and the advantages thereof, reference is now made to the following descriptions taken in conjunction with the accompanying drawings in which:

FIG. 1 is a side elevational view of a preferred embodiment of the wheel of this invention.

FIG. 2 is an exploded, cross-sectional view taken along line 2—2 in FIG. 1.

FIG. 3 is an exterior side elevational view of the outer member of the wheel of FIG. 2.

FIG. 4 is an exterior side elevational view of the inner member of the wheel of FIG. 2.

DETAILED DESCRIPTION OF THE INVENTION

Figure 5:
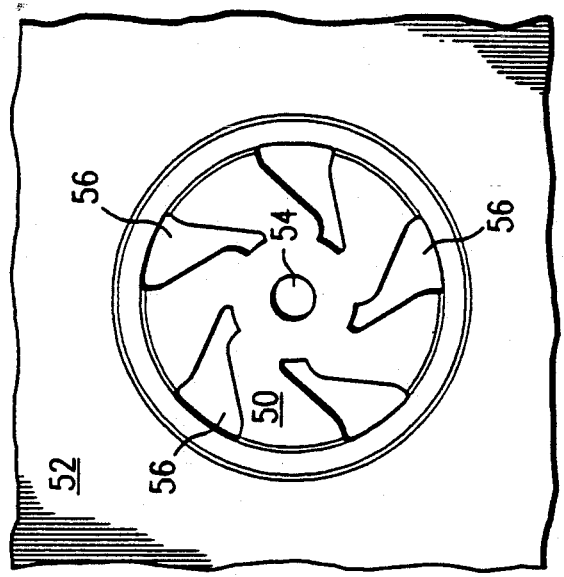
FIGS. 5-9 illustrate the preferred method for fabricating the inner wheel member of FIG. 2.

The preferred embodiment of the present invention and its advantages are best understood by referring to the drawings, like numerals being used for like and corresponding parts of the various drawings.

In FIG. 1 there is shown, in side elevational view, an assembled wheel 10 which embodies the present invention. Wheel 10 includes two outer members 12 and two inner members 14 (see FIG. 2). The outer member 12 is seen alone in frontal view in FIG. 3, and in cross-section in FIG. 2. Inner member 14 is seen alone in frontal view in FIG. 4, and in cross-section in FIG. 2. Wheel 10 also includes an externally threaded shaft 16 and an internally threaded spacer 18, both of which are best seen in FIG. 2.

Referring to FIG. 3, each outer wheel member 12 has a peripheral rim 20 and a plurality of spokes 22 extending generally inward from the peripheral rim 20 to a central hub 24. Hub 24 has an internally threaded orifice 26 extending therethrough. The peripheral rim 20 of each outer wheel member 12 preferably has a plurality of alignment holes 28 extending therethrough. The outer edges of the peripheral rims 20 have surfaces 30 which are concave in cross-sectional shape, as best seen in FIG. 2. The concave surfaces 30 face toward the outside of the wheel 10 when it is assembled.

Referring now to FIG. 4, each inner member 14 has a peripheral rim 32 and a plurality of spokes 34 extending generally inward from the peripheral rim 32 to a central hub 36. Hub 36 has an orifice 38 extending therethrough. The peripheral rim 32 of each inner member 14 preferably has a plurality of alignment pins 40 extending therefrom. One pin 40 could be used satisfactorily. Peripheral rims 32 also have surfaces 42 which are generally concave in cross-sectional shape, as best seen in FIG. 2. Concave surfaces 42 face toward the outside of the wheel 10 when it is assembled.

Referring now to FIG. 2, shaft 16 is externally threaded along its entire length, for threadably mating to the internally threaded orifices 26 of hubs 24 of outer wheel members 12, and to spacer 18. Shaft 16 also has an axial bore 44 extending therethrough for receiving an axle of a vehicle (not shown). Spacer 18 has an internally threaded orifice or hole 46 for threadably mating with shaft 16.

Wheel 10 is assembled from its various parts as follows: Spacer 18 is threaded to the mid-point 48 of shaft 16. Pins 40 on inner members 14 are inserted into holes 28 in a respective outer member 12. The ends of pins 40 may optionally be crimped to lock outer member 12 to inner member 14. Each end of shaft 16 is then inserted through orifice 38 of hub 36 of an inner member 14, and threaded into hub 24 of an outer member 12. Outer members 12 are threaded onto shaft 16 until hubs 36 of inner members 14 are seated firmly against the ends of spacer 18. Spacer 18 is used to maintain a predetermined distance between the opposite sides of wheel 10.

The assembled wheel 10 displays several novel features. It is quickly and easily assembled separately from a vehicle axle without any screws, bolts, nuts, rivets or peripheral bands. The spokes on each member 12 or 14 generally spiral from hub 24 or 36, respectively, to peripheral rim 20 or 32, respectively. Preferably, for optimum structural rigidity and a more attractive appearance, the spokes 34 of each inner member 14 spiral in a direction opposite that of the spokes 22 of the adjoining outer member 12. Concave surfaces 30 on peripheral rims 20 of outer members 12, and concave surfaces 42 on peripheral rims 32 of inner members 14, face toward the outside of wheel 12 when it is assembled, and form the tire-receiving rim of wheel 10.

The spokes 22 and 34 of wheel members 12 and 14 are formed integrally with the peripheral rims 20 and 32 and hubs 24 and 36, respectively. Although formed entirely from sheet metal, each integral rim-spokes-hub wheel member 12 or 14 is three dimensional and decorative. The assembled wheel 10 contains four spaced layers of spokes, and is highly decorative and attractive, closely resembling a wire-rim wheel. Although the spokes in each wheel member 12 or 14 are formed integrally with their peripheral rims 20 or 32 and hubs 24 or 36, respectively from sheet metal, the spokes have a striking similarity to wire spokes. The assembled wheel 10 receives either an inflatable or a non-inflatable tire (not shown). Tire mounting and removal are facilitated by the easy separability of the opposite sides of wheel 10. Axial bore 44 of shaft 16 extends entirely through the center of wheel 10 for receiving an axle of a vehicle. Finally, wheel 10 can be removed from a vehicle axle once installed, without disassembling wheel 10 or damaging the vehicle axle.

Wheel 10 may be modified by eliminating inner wheel members 14 entirely, in which case hubs 24 of outer wheel members 12 are threaded onto shaft 16 until hubs 24 are seated firmly against the ends of spacer 18 (not illustrated). In this embodiment, holes 28 would not be formed in peripheral rim 20 of outer wheel members 12. This alternative embodiment would be preferable where the weight or cost of wheel 10 should be minimized.

Figure 6:
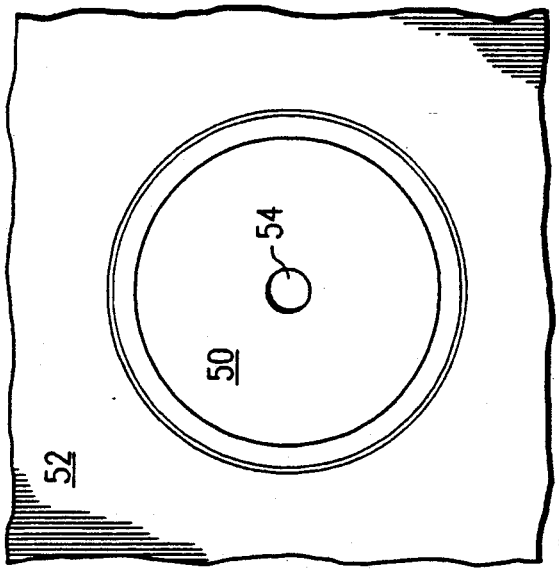
Figure 7:
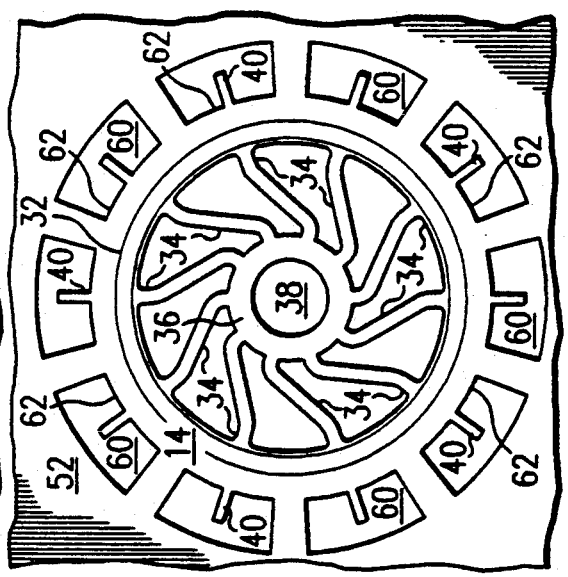

Inner wheel members 14 are formed from flat sheet metal by the following steps: Referring to FIG. 5, a circular depression 50 is first stamped into a piece of flat sheet metal 52, preferably of steel. A hole 54 is then punched at the center of the circular depression 50. Referring next to FIG. 6, a first plurality of orifices 56 is punched in the circular depression 50. As seen, each of these orifices 56 extends generally spirally from a point near the central hole 54 to near the edge of the depression 50, and each orifice 56 generally widens as it so extends, and forms one edge of adjacent spokes 34. Referring next to FIG. 7, a second plurality of orifices 58 is then punched in the metal of circular depression 50 remaining between the first plurality of orifices 56. Each of the second plurality of orifices 58 is disposed between a different two of the first plurality of offices 56. The second plurality of orifices 58 is generally similar in shape to the first plurality of orifices, so that a plurality of spokes 34 are left remaining in the circular depression 50 after the second plurality of orifices 58 have been punched. The spokes 34 at this point have generally square cross sections.

Figure 8:
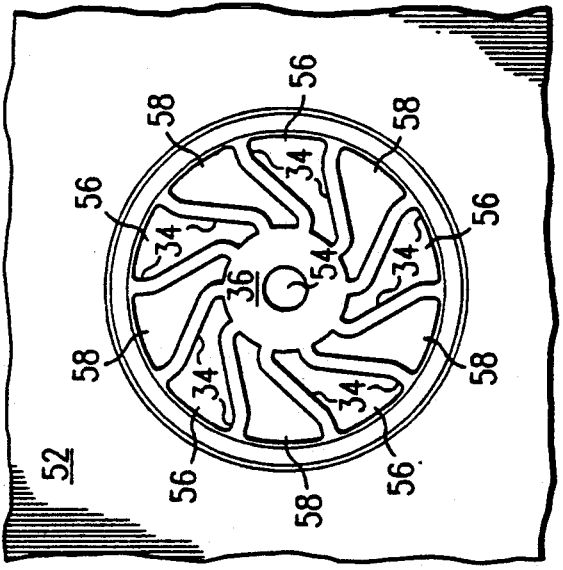

Referring next to FIG. 8, a circumferentially arranged third plurality of orifices 60 is then punched in the metal 52 around the spokes 34. Each of the third plurality of orifices 60 has a curved edge 62 which forms a segment of the outer edge of peripheral rim 32 of inner wheel member 14. The third plurality of orifices 60 are shaped so that the alignment pins 40 extend radially outward from the above-mentioned curved edge 62 of the third plurality of orifices 60.

Figure 9:
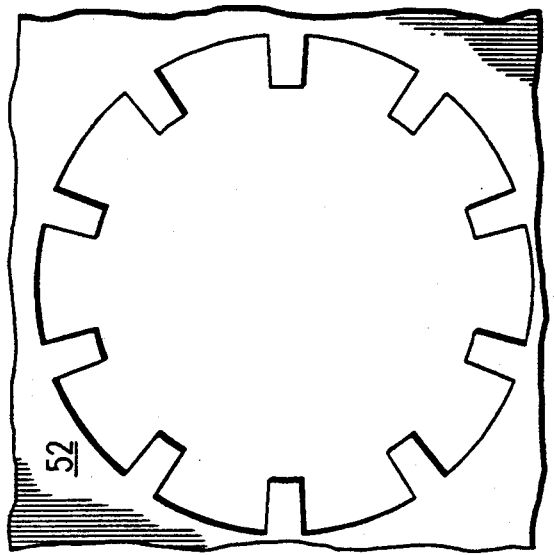

A first die is then used to round the corners on a first side of the spokes 34 and pins 40 to give the spokes 34 and pins 40 a generally half-round cross-section. A second die is then used to round the corners on the opposite or second side of the spokes 34 and pins 40 to give them a generally round cross-section. The pins 40 are later bent so that they extend in a direction generally perpendicular to the plane of the spokes 34. Hole 54 may be enlarged, if necessary, to form orifice 38 in hub 36. The inner wheel member 14 may then be separated from the surrounding sheet metal 52 by punching the metal remaining between each of the curved edges 62 of the third plurality of orifices 60, as seen in FIG. 9. After removal, the inner wheel member 14 may be electroplated with a protective metal such as zinc, tin or chrome.

Figure 10:
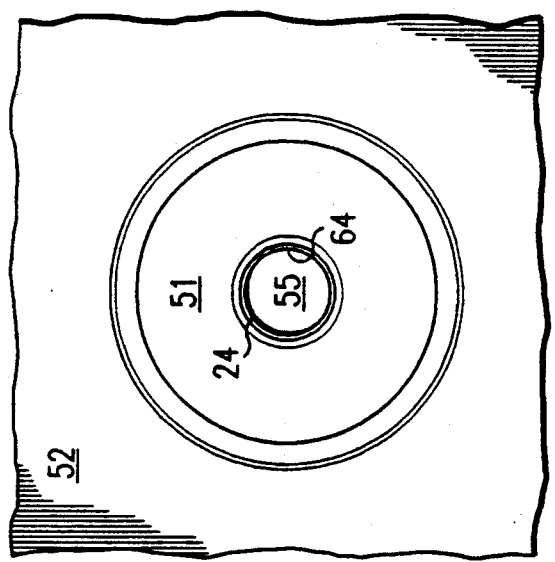
FIGS. 10-11 illustrate steps in the preferred method for fabricating the outer wheel member of FIG. 2.

Outer wheel members 12 are fabricated from flat sheet metal by the following steps: Referring to FIG. 10, a circular depression 51 is first stamped into a piece of flat sheet metal 52, preferably of steel. A hole 55 is then punched at the center of the circular depression 51. An annular lip or hub 24 is formed in the portion of the metal immediately surrounding the hole 55. The formed hub 24 has an internal surface 64 extending generally perpendicular to the plane of the depression 51. A thread 26 is later formed on the internal surface of hub 24. A first plurality of orifices (not illustrated) is punched in the circular depression 51 in a manner similar to that described with respect to the inner wheel member 14. Each of the first plurality of orifices extends generally spirally from a point near the central hole 55 to near the edge of the depression 51, and each orifice generally widens as it so extends, and forms one edge of adjacent spokes 22.

Figure 11:
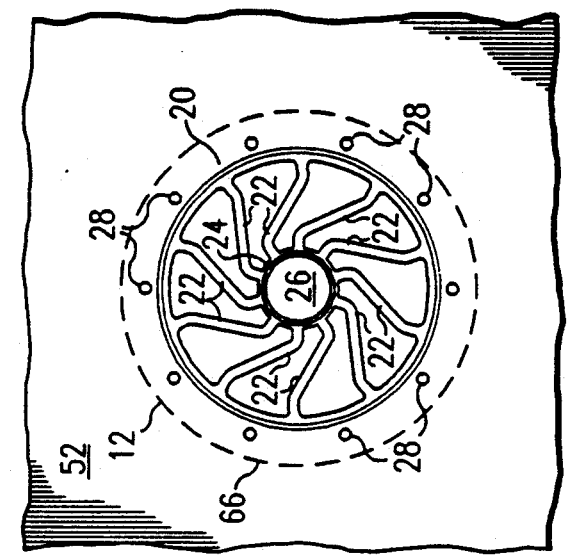

A second plurality of orifices (not illustrated) is then punched in the metal of circular depression 51 remaining between the first plurality of orifices in a manner similar to that described with respect to the inner wheel member 14. Each of the second plurality of orifices is disposed between a different two of the first plurality of orifices. The second plurality of orifices is generally similar in shape to the first plurality of orifices, so that a plurality of spokes 22 are left remaining in the circular depression 51 after the second plurality of orifices have been punched, as illustrated in FIG. 11. The spokes 22 at this point have generally square cross sections.

A first die is then used to round the corners on a first side of the spokes 22 to give the spokes 22 a generally half-round cross-section. A second die is then used to round the corners on the opposite or second side of the spokes 22 to give them a generally round cross-section.

A plurality of pin-receiving holes 28 are punched in the metal 52 surrounding the depression 51, as seen in FIG. 11. The metal 52 surrounding the pin-receiving holes 28 is then circumferentially punched along dashed line 66, and concentrically with the center of the hub 24, so as to separate the outer wheel member 12 from the surrounding sheet metal 52. After removal, the outer wheel member 12 may be electroplated with a protective metal such as zinc, tin or chrome.

Although an order of performing the specified steps for forming the inner and outer wheel members 14 and 12 has been set forth in the preceding description, it is recognized that several of the various steps can be performed in a different sequence than that set forth, and the invention is intended to include any other order in which the steps may be performed.

The present invention, and many of its intended advantages, will be understood from the foregoing description and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being merely a preferred or exemplary embodiment thereof.

What is claimed is:

1. A wheel, which comprises:
   a pair of inner members each having a peripheral rim, a central hub having an orifice extending therethrough, and a plurality of spokes extending generally inward from the peripheral rim to the central hub, the peripheral rim having at least one pin projecting therefrom;
   a pair of outer members each having a peripheral rim, a central hub having an internally threaded orifice extending therethrough, and a plurality of spokes extending generally inward from the peripheral rim to the central hub, the peripheral rim having a hole correspondingly arranged for each pin for receiving the pin when the inner members are mated to the outer members;
   an externally threaded shaft for threadably connecting to the orifices in the hubs of the outer members; and
   a spacer having an internally threaded hole extending therethrough for threadably mating with the externally threaded shaft between the hubs of the inner members for maintaining a predetermined distance between the inner members.

2. The wheel of claim 1, wherein the shaft has an axial bore extending therethrough for receiving an axle of a vehicle.

3. The wheel of claim 1, wherein the peripheral rims of the inner and outer members have surfaces which are concave in cross-sectional shape, each of which concave surface, when the members are assembled into a wheel, faces toward the outside of the wheel.

4. The wheel of claim 1, wherein the spokes of each member generally spiral from the hub to the peripheral rim thereof.

5. A wheel, comprising:
   a pair of outer members each having a peripheral rim and a plurality of spokes extending generally inward from the peripheral rim to a central hub having an internally threaded orifice extending therethrough;
   a pair of inner members each having a peripheral rim and a plurality of spokes extending generally inward from the peripheral rim to a central hub;
   means for connecting each inner member with a respective outer member to form a pair of opposite sides of the wheel;
   an externally threaded shaft for threadably connecting to the hubs of the outer members for connecting the opposite sides of the wheel; and
   a spacer having an internally threaded hole extending therethrough for threadably mating with the externally threaded shaft, the spacer disposed between the opposite sides of the wheel for maintaining a predetermined distance between the opposite sides thereof.

* * * * *